1,543,558

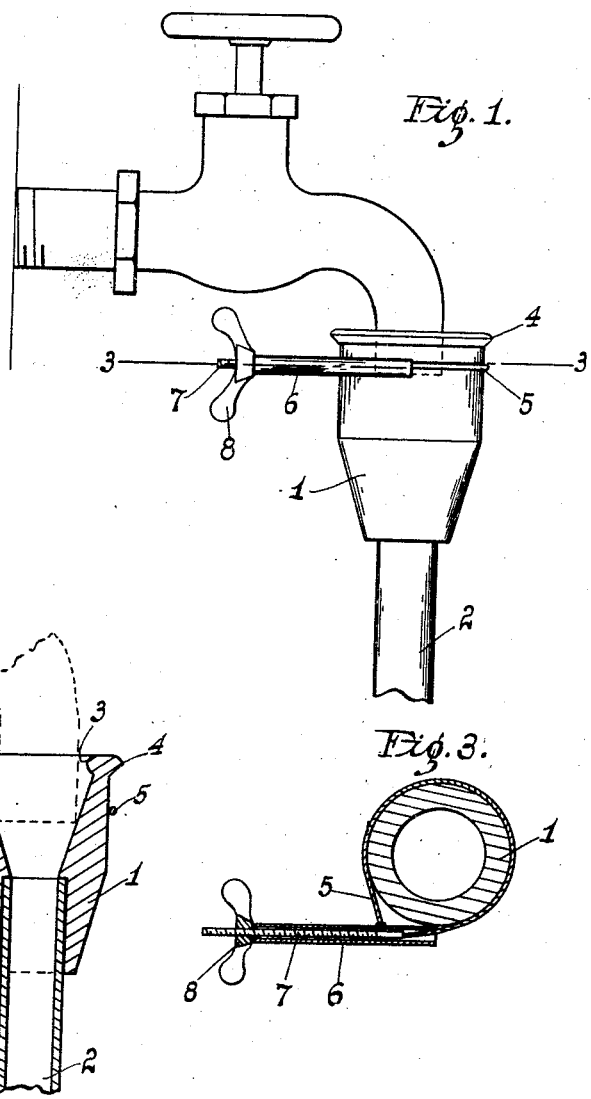

Patented June 23, 1925.

UNITED STATES PATENT OFFICE.

WILLIAM GUSTAV DONALD, OF OAKLAND, CALIFORNIA, ASSIGNOR TO SANITARY DRAIN FLUSHER, INC., A CORPORATION OF DELAWARE.

HOSE CONNECTION FOR FAUCETS.

Application filed May 2, 1921. Serial No. 466,176.

*To all whom it may concern:*

Be it known that I, WILLIAM GUSTAV DONALD, a citizen of the United States, residing at Oakland, in the county of Alameda and State of California, have invented certain new and useful Improvements in Hose Connections for Faucets, of which the following is a specification.

My invention is a hose connection, particularly useful for connecting a hose to a faucet, and comprises improved means whereby the hose may be quickly and securely connected or disconnected.

Referring to the annexed drawing in which my invention is illustrated:

Figure 1 is a side elevation of my hose connection connected to a faucet.

Figure 2 is a longitudinal section of my hose connection.

Figure 3 is an end view of my hose connection.

In the drawing 1 indicates a coupling sleeve made of resilient material, preferably rubber. In one end of said sleeve is fitted one end of a hose 2. The inner surface of said sleeve is conical shape, diverging toward the other end of the sleeve, on which end is formed an internal annular bead 3 and an external annular bead 4. A wire 5 surrounds the sleeve 1 near its beaded end, one end of which wire is connected to a tube 6, the other end of said wire being connected to the inner end of a screw 7 extending into said tube. A wing nut 8 screws on the outer end of the screw 7 against the end of the tube 6, whereby the wire 5 is contracted around the sleeve 1 and said sleeve clamped around the end of the faucet which fits in the conical interior end of the sleeve.

As clearly illustrated, the body 1 is of appreciable thickness and normally retains an upright cylindrical shape so as to be readily placed over the spout of a faucet. As the body is formed of resilient rubber it is elastic and will readily conform to the shape of the faucet spout over which it is inserted. Also, as the faucet spout receiving recess decreases downwardly in cross-area, this recess is adapted for reception of different sizes of faucet spouts. The flexible securing band or wire 5 will readily conform to the shape of body 1 when applied to a faucet and will compress the body in a plane at right angles to the axis of the body, as clearly illustrated in Fig. 2, thus avoiding any tendency of the body to twist away from the faucet spout. When band 5 is drawn tightly about the body a short distance above the outer end of the faucet spout, as indicated in Fig. 2, the body is compressed tightly about the spout of the faucet so as to form a water tight closure about the same and is effectually secured on the faucet in such manner as not to be forced off of the faucet by the pressure ordinarily encountered in domestic water supply systems. This provides a universal connector of very simple and inexpensive construction which can be quickly and easily applied to a faucet of any one of the standard sizes and shapes of faucets commonly used.

As the body of sleeve 1 is cylindrical and the faucet receiving depression is of inverted frusto-conical shape, the surrounding wall of the body increases uniformly in thickness downwardly, as clearly illustrated in Fig. 2. Due to this increasing thickness in the wall of the body, a clamp incapable of having its effective length varied within wide limits would not be practical for securing the body on the faucet spout. In example, when the device is applied to a large sized faucet, the clamping wire 5 is positioned at the thinner portion of the wall of the body and comparatively slight compressing of this wall is sufficient to secure the body tightly on the faucet spout. When the device is applied to a faucet spout of smaller size, however, the surrounding wall of the body will have to be compressed to a greater extent and the effective length of the clamping wire 5 will have to be varied accordingly. For this reason, a clamp which can not have its effective length varied within wide limits is not practical for use with this device, as stated, and I have therefore provided the clamp illustrated and above described, which meets this very necessary requirement and has been found to be highly efficient.

I am aware that it has been proposed to use connectors having elastic bodies which fit over the ends of faucet spouts provided with an outer bead or shoulder for holding the body in position, as well as connectors having elastic bodies which fit about the faucet spout and are intended to be held thereon by friction. Neither of these forms of connectors have proved satisfactory, however, as they are readily forced off of the faucet by the pressure of the water, particularly after they have been in use for a short time and the rubber has lost some of its life or elasticity, and the first form referred to can be used in connection with only one special form of faucet. I am also aware that it has been proposed to use connectors having a body fitting about a faucet spout and a non-flexible clamp for securing the body in position, but this form of connector is objectionable in that it can be used for only one size and shape of faucet spout. Though there has been for years a demand for a universal faucet connector which can be readily applied to faucets of any of the many standard sizes and shapes now in common use and can be effectually secured on the faucet so as not to be forced off of the same by the pressure of the water, or accidentally pulled off of the faucet, a connector which will fulfill these essential requirements has never, so far as I am aware, been devised in a practically available form previous to my above described invention. I do not, therefore, claim broadly a connector having an elastic body to fit about a faucet spout, nor a connector having a body fitting about a faucet spout in conjunction with a non-flexible clamping device, but I do claim as my invention a connector having a body and a clamping device constructed and arranged in the manner illustrated and described and capable of being applied to and effectually secured on faucet spouts of different sizes and shapes, thus providing a universal connector of high efficiency.

Having described my invention, I claim as new and desire to secure by Letters Patent:

1. In a universal faucet connector of the character described, a sleeve including a cylindrical body of soft elastic material provided with a faucet receiving depression of inverted frusto-conical shape extending from its upper end, an outlet member extending from the lower end of the body, the surrounding wall of the body being of comparatively great thickness and increasing in thickness downwardly, a clamping member mounted about the body and adjustable axially thereof, said member being disposed at right angles to the axis of the body, and means for varying the effective length of the clamping member for compressing said body radially thereof.

2. In a universal faucet connector of the character described, a sleeve including a cylindrical body of soft elastic material provided with a faucet receiving depression of inverted frusto-conical shape extending from its upper end, an outlet member extending from the lower end of the body, the surrounding wall of the body being of comparatively great thickness and increasing in thickness downwardly, a tubular member, a flexible clamping member having one end secured to the tubular member adjacent the inner end thereof, said clamping member passing around the body, a threaded member adjustable through said tubular member, the other end of said flexible member being secured to the inner end of the adjustable member, and an adjusting nut threaded on said adjustable member and bearing against the outer end of said tubular member.

3. A securing device for use in connection with radially compressible members, said device including a tubular member, a flexible securing member having one end secured to the tubular member adjacent one end thereof, a threaded member inserted through the tubular member from one end thereof, the flexible member having its other end secured to the threaded member and forming a loop, and a nut threaded on said threaded member and bearing against the other end of the tubular member for adjusting the effective length of said flexible securing member.

In testimony whereof I affix my signature.

WILLIAM GUSTAV DONALD.